July 30, 1946.  W. N. AXE  2,404,897
ALKYLATION PROCESS
Filed Nov. 24, 1942
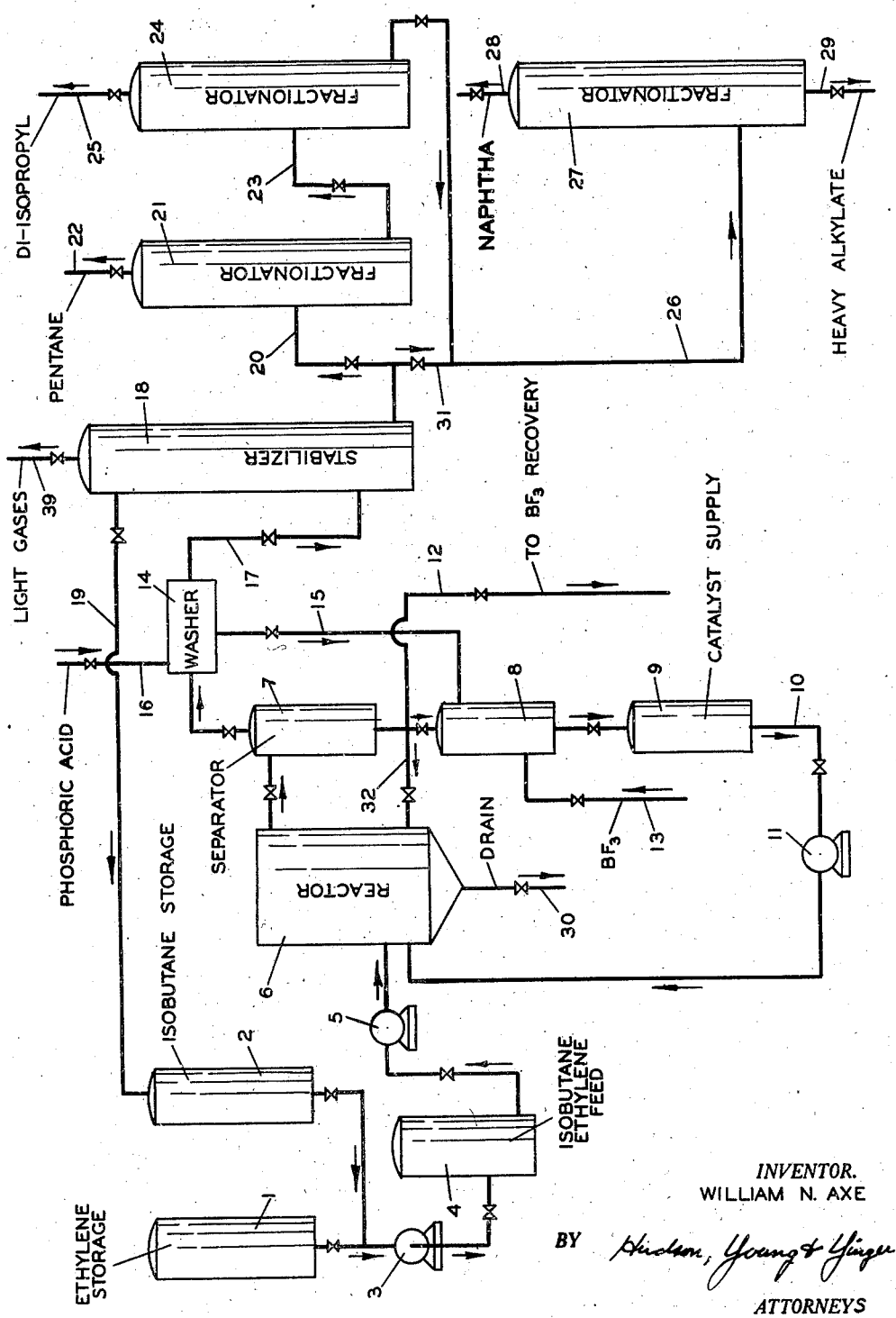
INVENTOR.
WILLIAM N. AXE
BY Hudson, Young & Yinger
ATTORNEYS Patented July 30, 1946

2,404,897

UNITED STATES PATENT OFFICE 2,404,897

ALKYLATION PROCESS

William Nelson Axe, Bartlesville, Okla., assignor to Phillips Petroleum Company, a corporation of Delaware Application November 24, 1942, Serial No. 466,762

5 Claims. (Cl. 260—683.4)

This invention relates to the synthesis of high octane-number isoparaffinic hydrocarbons from lower molecular weight isoparaffins and ethylene. More specifically, this invention relates to the alkylation of low-boiling isoparaffins with ethylene under moderate conditions of temperature and pressure in the presence of a novel alkylation catalyst. In one specific modification this invention relates to an improved process for the utilization of ethylene in the alkylation of isoparaffins such as isobutane to produce isoparaffin fractions of exceptional value as components of aviation fuel.

The introduction of alkyl groups into the benzene ring in the presence of the various Friedel-Crafts type catalysts is a classic reaction in organic chemistry. More recently alkylation, involving isoparaffins and olefins, has been extended to the field of aliphatic chemistry as a result of the demands for saturated hydrocarbon stocks of high octane rating in the manufacture of aviation gasoline. Even more recently recognition of the importance of the so-called "rich-mixture rating" of aviation fuels has given added impetus to the synthesis of specific hydrocarbon types. Thus it has been found that certain gasolines of requisite octane rating are deficient in performance under conditions involving the high fuel-air ratios often demanded in military air-craft operation. Alkylated aromatic hydrocarbons have been found to improve the rich-mixture characteristics of high-octane gasoline, but because of their low volatility the quantity of such additives that can be incorporated into the blend is necessarily limited. On the other hand, the isoparaffin, 2,3-dimethylbutane hereinafter referred to as di-isopropyl, is characterized by its good rich-mixture rating and a volatility permitting concentrations of 10 per cent and higher in finished gasoline blends.

Except for nearly negligible quantities laboriously isolated from natural gasoline, di-isopropyl is obtained primarily as a synthetic product. The most convenient direct synthesis of hexane hydrocarbons involves the alkylation of isobutane with ethylene. Although the alkylation of isoparaffins in general and isobutane in particular with olefins of three or more carbon atoms is now a well established practice, the utilization of ethylene in reactions of this type has been extremely difficult. Thus certain acid catalysts such as sulfuric and phosphoric acids, while relatively quite effective in alkylation reactions involving olefins of three or more carbon atoms, have been found inadequate when applied to isoparaffin-ethylene reactions.

Insofar as the prior art is concerned anhydrous aluminum chloride activated with hydrogen chloride appears to be the best catalyst described as applicable to alkylation with ethylene and its higher homologues. However, there are certain valid objections to the use of this catalyst combination among which there may be mentioned; isomerization of the isoparaffins and autodestructive alkylation forming high boiling products and polymerization of the olefin feed to form sludge materials. Thus with olefins above ethylene in the homologous series attempts to minimize these undesirable characteristics have been made by operating at temperatures below 32° F. Even with the less reactive ethylene, a lack of specificity at room-temperature operation has been reported for the alkylation of butane with ethylene in that hexanes so produced amounted to only a minor proportion of the total alkylate and the di-isopropyl fraction made up only a still smaller per cent of the total alkylate.

It is the object of the present invention to provide a process for the alkylation of isoparaffins in general, and isobutane in particular, with ethylene employing an improved catalyst capable of operating with a high degree of specificity under operating conditions conveniently attained in industrial practice. The specific action of my novel catalyst will be illustrated by subsequent data showing the total alkylate to have an isohexane content ranging from 50 to 80 volume per cent with pure di-isopropyl comprising 93 to 95 per cent of the isohexane fraction. Other objects and advantages will be apparent from the accompanying disclosure and discussion.

This application is a continuation-in-part of my copending application Serial No. 459,985, filed September 28, 1942, in which is broadly disclosed the use of my preferred catalyst in the alkylation of isoparaffins with olefins.

The catalyst composition of this invention is prepared by treating phosphoric acid of variable water content with anhydrous boron fluoride until complete saturation has been realized. With 100 per cent phosphoric acid substantially one mol of boron fluoride is absorbed per mol of acid while in the case of aqueous solutions both the phosphoric acid and water absorb boron fluoride approximately mol for mol. No theories are advanced as to the chemistry involved in the catalyst preparation, but it is presumed that a type of chemical combination often referred to as a complex or addition compound has resulted. The complex derived from boron fluoride and water is usually designated as boron fluoride hydrate. Where 100 per cent phosphoric acid is concerned, the empirical representation of its complex with boron fluoride is $H_3PO_4.BF_3$. In the same manner catalysts prepared from aqueous phosphoric acid and boron fluoride would be a mixture of the following components: $H_3PO_4.BF_3$ and $H_2O.BF_3$.

The boron fluoride-orthophosphoric acid catalyst is prepared by adding gaseous boron fluoride to the acid, or an aqueous solution thereof. The resulting reaction is exothermic and the rate of boron fluoride addition is usually controlled together with external cooling of the addition product and/or products to avoid temperatures much above 200° F. Saturation of the acid solution and completion of the preparation is denoted usually by escaping boron fluoride fumes or by a constant specific gravity.

The presence of boron fluoride hydrate in the catalyst composition is not essential to the catalysis of the isobutane-ethylene reaction although it may co-operate and/or promote the activity of the $H_3PO_4.BF_3$ complex. On the other hand relatively large percentages of the hydrate do not interfere with this reaction as may be the case where alkylation of the higher molecular weight olefins are concerned. Since the polymerizing activity of the hydrate is well known high percentages are to be avoided with olefins such as the butylenes. However, with regard to ethylene alkylation a wider latitude is possible since ethylene exhibits a much greater resistance to polymerization.

The phosphoric acid employed may be in concentrated form, ranging from the 85 per cent acid of commercial grade up to about 100 per cent or more of $H_3PO_4$; or aqueous solutions containing as little as 20–40 per cent $H_3PO_4$ may be employed. For most applications the moderately concentrated to concentrated acid is ordinarily preferred for several reasons: (1) a considerable economy in boron fluoride consumption per volume or per unit weight of catalyst is effected; (2) less boron fluoride is carried away with the effluent hydrocarbon; (3) the production of a less corrosive catalyst; (4) a better recovery of boron fluoride from spent catalyst by convenient means.

The unique action of aqueous phosphoric acid in the preparation of my preferred catalyst is demonstrated by the fact that other mineral acids such as sulfuric acid and hydrochloric acid fail to result in catalysts of comparable activity even though the quantity of boron fluoride hydrate may be appreciable. This is especially true of sulfuric acid which appears to have an inhibiting effect on the catalytic activity of boron fluoride complex compounds.

I have discovered that the alkylation of isobutane with ethylene to produce a high yield of di-isopropyl is smoothly and efficiently promoted by catalysts which comprise saturated solutions of boron fluoride in ortho phosphoric acid of variable water content. While the alkylation process can be carried out under a wide range of mild conditions it often comprises the contacting of controlled molar proportions of isobutane and ethylene with the liquid catalyst under conditions that produce a high degree or even substantially complete ethylene utilization. The hydrocarbon product mixture is continuously separated from the catalyst and the alkylate is separated from unconverted isobutane by means of fractional distillation. Subsequent distillation is employed to separate the di-isopropyl from the total alkylate. Alternately, if desired, the alkylate may be fractionated to separate traces of high boiling material and employed directly as a blending agent in the preparation of high octane aviation fuels.

A specific preferred embodiment of the process is illustrated in the flow diagram which shows diagrammatically an arrangement for process equipment for the continuous alkylation of isobutane with ethylene to produce and segregate products valuable as blending ingredients of aviation gasoline. Ethylene and isobutane are withdrawn from suitable sources, represented by storage tanks 1 and 2 and passed by means of pump 3 to feed tank 4. The isobutane-ethylene blend is fed to reactor 6 by means of pump 5. Reactor 6 is equipped with means of agitation such as motor driven agitators, jet mixers, a recirculation pump, or the like, and line 30 may be used, when necessary, to drain the reactor. Provision is also made for removal of the heat of reaction by conventional design. An emulsion of hydrocarbon and catalyst is continuously withdrawn from the reactor to catalyst separator 7. Because of the relatively high specific gravity of the catalyst, separation by gravity is rapidly effected and a portion of the catalyst phase is drawn off into tank 8 and a portion is discarded through line 12 for recovery of boron fluoride. Make-up catalyst is provided by the introduction of boron fluoride from line 13 and partially saturated acid delivered from the washer 14 by line 15. Maintenance of a catalyst phase completely saturated with boron fluoride is the function of tank 8. From tank 8 the catalyst is delivered to tank 9, from which it is pumped back through line 10 by pump 11, into reactor 6. If desired, a portion of the catalyst may be directly recycled from separator 7 through line 32.

Effluent hydrocarbon is passed from separator 7 into washer 14 where intimate contacting with phosphoric acid, introduced through line 16, removes the last traces of boron fluoride. The acid in the washer also serves as the feed for the preparation of fresh catalyst. An auxiliary water washer or a clay tower, not shown, may be employed immediately following the acid wash to remove any entrained acid. The hydrocarbon stream then is passed through line 17 into stabilizer 18 where the isobutane is taken overhead and returned to storage via line 19. Any uncondensed gases such as ethylene or ethane, etc., may be separated and vented either from the stabilizer through line 39 or from auxiliary gas stripping equipment (not shown). The stabilized total alkylate is passed through line 20 into the fractionating column 21 where a pentane fraction is removed as an overhead fraction and passed to storage through line 22. The kettle product, now comprising hexanes and heavier, is charged to fractionator 24 through line 23 and isohexanes, of which di-isopropyl is the major component, are taken overhead leaving heptane and heavier as the kettle product to be charged to fractionator 27. A naphtha fraction in the gasoline range and of good octane number and lead response constitutes the overhead product. The small amount of heavy alkylate is withdrawn through line 29 for utilization elsewhere.

When the illustrated separation and concentration of di-isopropyl is not desired, the stabilized, substantially $C_4$-free alkylate may pass through line 31 to fractionator 27, wherein the small amounts of heavy alkylate may be separated. A fraction of suitable end-point is taken overhead through line 28. A further modification may be practiced wherein both C4 and C5 hydrocarbons are separated prior to fractionation of the alkylate in the manner described.

Although the catalyst of this invention displays a high degree of specificity toward the formation of di-isopropyl under a wide variety of operating conditions, when isobutane and ethylene are the reactants, the careful regulation of operating variables is essential for optimum performance. The most important variables are: contact time, temperature, isoparaffin-olefin ratio and hydrocarbon-catalyst ratio. Other variables which are largely dependent on the mode of operation are: degree of dispersion of catalyst in the hydrocarbon and pressure.

In general it may be said that contact times for ethylene conversion must be somewhat longer than for the higher olefins. Where the contact or residence time in the reactor is short, incomplete conversion of the ethylene may result even with a fully active catalyst and involve either loss or recycling of the ethylene. Defining the contact time as the following ratio:

$$\frac{\text{HC vol. in reactor}}{\text{Effluent vol. per min.}}$$

I have found about 10 to about 30 minutes sufficient for good conversion. Longer contact times may be employed with partially spent catalysts, but in general an excessive contact time may result in alkylate deficient in quality.

The control of temperature is exceedingly important in the operation of this process. At temperatures below 100° F., the rate of reaction is ordinarily too slow to be economically feasible. On the other hand temperatures exceeding 150 to 180° F. may favor the formation of hexanes having very low octane ratings. I have found that satisfactory operation with good ethylene conversion and high quality alkylate may be realized at temperature levels between about 110 and about 145° F. Since the reaction is exothermic, judicious control of flow rates will permit close temperature control with ordinary cooling water.

While the catalyst of the present invention is sufficiently selective to allow operation with only a moderate excess of isoparaffin in the feed mixture, it is usually preferred to maintain the isobutane-ethylene mol ratio in the feed above about 1:1 and below about 10:1. I have found that an isobutane-ethylene mol ratio of 2:1 to 3:1 to be highly satisfactory, however, an alkylate of somewhat higher quality can be produced with higher mol ratios in the neighborhood of about 8:1. The manner of feed introduction will often be such that in the reaction zone itself, the ratio of isoparaffin to olefin is substantially higher, and may be as high as 50:1 to 100:1, or more.

The hydrocarbon to catalyst ratio that must be maintained in the reactor may vary widely depending on the efficiency of contacting and the rate of flow through the reaction zone. With reasonably good agitation a ratio of about four volumes of hydrocarbon per volume of catalyst is usually adequate, although higher or lower ratios may be employed without material harm to the quality of the hydrocarbon product.

Pressures are chosen in accordance with the reaction requirements as determined by the composition of the feed stock, the reaction temperature and the pressures desirable in subsequent operation. Pressures ranging from about 50 pounds gage for lean ethylene feeds to 500 pounds gage for rich ethylene feed stocks are often used. Regardless of operating conditions in general, sufficient pressure should be applied in order to insure liquid phase operation in the reactor.

The alkylate produced from isobutane and ethylene by the boron fluoride catalyst composition of the invention is comprised of completely saturated hydrocarbons usually having an overall boiling range of approximately 82–350° F. after separation of excess isobutane. The ASTM octane rating of the total alkylate may vary from about 89.0 to 90.0, or higher, with a lead response such that the addition of 1 cc. of tetraethyl lead is sufficient to give a 100 octane number or higher.

Fractional distillation of the total alkylate from a typical run reveals the following composition:

| | Vol. per cent |
|---|---|
| Isopentane | 6.5 |
| Hexanes | 61.0 |
| Heptanes | 3.5 |
| Octanes | 16.5 |
| Nonanes and heavier | 12.5 |
| | 100.0 |

The fraction boiling between 136 and 140° F. amounted to 93.5 volume per cent of the hexane fraction and comprised di-isopropyl of 95 per cent purity. The physical constants of the fractions comprising the di-isopropyl concentrate indicated 2-methylpentane as the impurity. The octane number of the di-isopropyl concentrate was 93.0 as determined by the ASTM method. As a result of the selectivity of the catalyst described herein, the fractionation problem with respect to di-isopropyl has been greatly reduced and the total hexane fraction is suitable for many purposes. Thus, whereas the above di-isopropyl concentrate is easily separated with fractionation equipment of only moderate efficiency, a much higher efficiency is required to separate the di-isopropyl from the low octane-number 2-methylpentane where the latter is present in appreciable quantity in the hexane fraction.

The following exemplary operations will serve to illustrate specific procedures in carrying out the process of this invention and the improved results obtained thereby. The examples are not, however, to be construed as unnecessary limitations on the practice of the invention.

*Example I*

A hydrocarbon feed mixture of isobutane and ethylene in a mol ratio of 3 to 1 was intimately contacted with a liquid boron fluoride-orthophosphoric acid catalyst. The catalyst was prepared by diluting phospholeum of 83 per cent P2O5 content with sufficient 85 per cent phosphoric acid to give 100 per cent phosphoric acid which was then saturated with anhydrous boron fluoride. The alkylation reaction was carried out as a continuous process under 250 pounds gage pressure. The hydrocarbon phase in the reactor amounted to four volumes per volume of catalyst and the average time of contact was adjusted at 35 minutes. The reaction temperature was held at 100–106° F. throughout the reaction. The final stabilized alkylate had an overall boiling range of 80 to 340° F. and was substantially completely saturated. A di-isopropyl concentrate of 92.5 ASTM octane number made up 50 per cent of the total alkylate.

*Example II*

The preparation of di-isopropyl was carried out by the continuous alkylation of isobutane with ethylene in the presence of a catalyst prepared by saturating 85 per cent phosphoric acid with boron fluoride. The catalyst contained 53 per cent by weight of boron fluoride which corresponds to a mol for mol reaction between the boron fluoride and phosphoric acid and water, respectively. Substantially complete conversion of the ethylene was realized under the following reaction conditions:

Hydrocarbon feed:
    Isobutane____per cent by weight__ 87.7
    Ethylene_____do____ 12.3
    Mol ratio, isobutane/ethylene_____ 3.44:1
Hydrocarbon/catalyst, volume ratio in reaction zone_____ 2.5:1
Contact time_____minutes__ 40
Temperature range_____° F__ 120–125
Pressure_____p. s. i.__ 205

The di-isopropyl concentrate distilling between 135–139° F. comprised 53 volume per cent of the total alkylate. The refractive index of this fraction ($N_D^{20}$, 1.3746) and the ASTM octane number (93.1) indicate a di-isopropyl content of more than 95 per cent.

*Example III*

The catalyst described in Example II was employed in this operation. The general alkylation procedure involved the liquid-phase introduction of the isobutane-ethylene feed into a metal reactor containing the catalyst. The reaction was carried out as a semi-continuous process with mechanical agitation being employed in contacting the hydrocarbon feed and catalyst. The effluent from the reactor was recycled to the reactor along with make-up ethylene. Reaction conditions were maintained within the following limits:

Initial hydrocarbon feed:
    Isobutane____per cent by weight__ 89.0
    Ethylene_____do____ 11.0
    Mol ratio, isobutane/ethylene_____ 3.91:1
Hydrocarbon/catalyst, volume ratio in reactor_____ 4.7:1
Contact time_____minutes__ 34
Temperature range_____° F__ 110–120
Pressure_____p. s. i.__ 200

A completely saturated total alkylate was produced having a gravity of 76.6° API. A di-isopropyl concentrate distilling between 134–140° F. and constituting 53 volume per cent of the total alkylate was recovered by fractionation from a still of 20 to 25 theoretical plates. The octane rating of the concentrate was found to be 92.9 ASTM.

*Example IV*

The catalyst for this run was prepared by saturating 50 per cent phosphoric acid with boron fluoride. The absorbed boron fluoride amounted to about 2.2 parts by weight for each part of acid.

The hydrocarbon feed was introduced continuously into the reactor containing the catalyst in a once through operation. Substantially complete conversion of ethylene was realized under the following operating conditions:

Feed composition:
    Isobutane____per cent by weight__ 84.15
    Ethylene_____do____ 15.85
    Mol ratio, isobutane/ethylene_____ 2.56:1
Hydrocarbon/catalyst, volume ratio in reactor_____ 2.5:1
Contact time_____minutes__ 30
Temperature range_____° F__ 120–130
Pressure_____p. s. i.__ 225

The stabilized alkylate showed an overall boiling range of 80 to 350° F. Octane-number ratings by the ASTM method with 0.0 and 1.0 cc. of tetraethyl lead were 90.0 and 100.0, respectively.

The di-isopropyl concentrate distilling between 135–139° F. amounted to 50 volume per cent of the total alkylate. The octane rating of the clear concentrate was 92.5 by the ASTM method.

*Example V*

The catalyst for this run was prepared by saturating 85 per cent commercial phosphoric acid with boron fluoride. The continuous operation described in the previous example was followed in this instance. The operating conditions were as follows:

Feed composition:
    Isobutane____per cent by weight__ 92.5
    Ethylene_____do____ 7.5
    Mol ratio, isobutane/ethylene_____ 6.0:1
Hydrocarbon/catalyst, volume ratio in reactor_____ 2.5:1
Contact time_____minutes__ 25
Temperature range_____°F__ 115–120
Pressure_____p. s. i.__ 200

An isohexane fraction boiling between 135–139° F. amounted to 75 per cent by volume of the total alkylate. The ASTM octane rating of the di-isopropyl concentrate was found to be 92.7.

While the foregoing disclosure and exemplary operations have served to describe the invention and specific applications thereof, it will be obvious that many modifications are possible within the scope of the broad disclosure. Thus, while alkylation of isobutane has been emphasized, with suitable process modifications, the alkylation of isopentane may be similarly accomplished in the presence of the catalyst compositions described. In large scale commercial operations the ethylene feed to the process is preferably of relatively high purity to avoid the handling and separation of inert material. However, a dilute ethylene stream may be utilized, with the inert impurities (usually ethane and/or propane) being separated and returned, if desired, to the facilities producing the ethylene for further conversion. The isobutane will generally be obtained from such associated operations as segregation from refinery or natural gasoline $C_4$ fractions, normal butane isomerization processes, and the like. The amount of normal butane in the isobutane feed to the process may vary appreciably, and provisions are usually made to maintain suitably low concentration thereof, even with indicated isobutane recycle. The same considerations apply to other isoparaffin reactants. These and other modifications and adaptations of the present process will be obvious to one skilled in the art and suitable conditions for any particular case may be readily determined by trial.

I claim:

1. A process for the alkylation of a low-boiling isoparaffin with ethylene, which comprises reacting such an isoparaffin with ethylene in an alkylation zone under alkylation conditions in the presence of an alkylation catalyst comprising an addition compound resulting from the combination of an acid of phosphorus with boron trifluoride, separating effluents of said alkylation into a catalyst phase and a hydrocarbon phase, contacting said hydrocarbon phase with a liquid acid of phosphorus to remove nonhydrocarbon impurities including boron trifluoride, removing said liquid acid of phosphorus from said hydrocarbon phase and admixing same with at least a portion of said catalyst phase, adding boron trifluoride to the resulting mixture, passing the resultant catalytic material to said alkylation zone, and subsequently separating from the resulting purified hydrocarbon phase paraffin hydrocarbons produced in said alkylation.

2. A process for reacting isobutane with ethylene, which comprises contacting in an alkylation zone a mixture comprising said hydrocarbons, and containing a molar excess of isobutane, under alkylation conditions with a liquid catalyst comprising essentially an addition compound resulting from saturating with boron trifluoride aqueous orthophosphoric acid containing about 85 per cent by weight of orthophosphoric acid, intimately admixing hydrocarbons effluent from said alkylation zone with aqueous orthophosphoric acid to remove minor quantities of boron trifluoride associated therewith, separating the resulting orthophosphoric acid-containing mixture from hydrocarbons so treated, adding to said mixture additional quantities of boron trifluoride to effect substantially complete saturation thereof, and passing the resulting material to said alkylation zone as catalyst.

3. A process for reacting a low-boiling isoparaffin hydrocarbon with a low-boiling olefin hydrocarbon, which comprises contacting in an alkylation zone a mixture comprising such hydrocarbons, and containing a molar excess of said low-boiling isoparaffin, under alkylation conditions with a liquid catalyst comprising essentially an addition compound resulting from saturating with boron trifluoride an acid of phosphorus, intimately admixing hydrocarbons effluent from said alkylation zone with an acid of phosphorus to remove minor quantities of boron trifluoride associated therewith, separating the resulting acid of phosphorus-containing mixture from said hydrocarbons and adding to said mixture additional quantities of boron trifluoride to effect substantially complete saturation thereof, and passing the resulting material to said alkylation zone as catalyst.

4. In a process for reacting a low-boiling isoparaffin hydrocarbon with a low-boiling olefin hydrocarbon by contacting in an alkylation zone a mixture comprising such hydrocarbons, and containing a molar excess of said isoparaffin, under alkylation conditions with a liquid catalyst comprising essentially an addition compound resulting from saturating orthophosphoric acid with boron trifluoride, the improvement which comprises intimately admixing hydrocarbons effluent from said alkylation zone with a liquid orthophosphoric acid to remove minor quantities of boron trifluoride associated therewith, separating the resulting mixture of liquid orthophosphoric acid and removed boron trifluoride from said hydrocarbons and adding to said mixture additional quantities of boron trifluoride to effect substantially complete saturation thereof, and passing the resulting material to said alkylation zone as at least a portion of the catalyst employed therein.

5. The process of claim 3 in which said low-boiling isoparaffin is isobutane, said low-boiling olefin is ethylene, and said liquid catalyst comprises essentially an addition compound resulting from saturating with boron trifluoride aqueous orthophosphoric acid containing about 85 per cent by weight of orthophosphoric acid.

WILLIAM NELSON AXE.